United States Patent [19]

Okamoto et al.

[11] Patent Number: 4,909,371
[45] Date of Patent: Mar. 20, 1990

[54] FOUR WHEEL DRIVING POWER

[75] Inventors: Tokuo Okamoto; Koji Kitano, both of Ikeda; Masaharu Sumiyoshi, Toyota, all of Japan

[73] Assignee: Daihatsu Motor Co., Ltd., Osaka, Japan

[21] Appl. No.: 133,619

[22] Filed: Dec. 16, 1987

[30] Foreign Application Priority Data

Jul. 23, 1987 [JP] Japan .................. 62-184858

[51] Int. Cl.⁴ ............... F16D 25/063; F16D 43/284
[52] U.S. Cl. ...................... 192/103 F; 180/248; 192/85 AA
[58] Field of Search ............ 180/249, 248; 74/711; 192/103 F, 85 AA

[56] References Cited

U.S. PATENT DOCUMENTS

| | | | |
|---|---|---|---|
| 2,949,792 | 8/1960 | Smith | 74/711 |
| 3,752,280 | 8/1973 | Cheek | 192/85 AA |
| 4,012,968 | 3/1977 | Kelbel | 74/711 |
| 4,041,804 | 8/1977 | Clark | 74/711 |
| 4,445,400 | 5/1984 | Sullivan et al. | 192/85 AA X |
| 4,452,100 | 6/1984 | Sullivan et al. | 74/711 |
| 4,719,998 | 1/1988 | Hiramatsu et al. | 192/103 F X |
| 4,727,966 | 3/1988 | Hiramatsu et al. | 192/103 F X |
| 4,730,514 | 3/1988 | Shikata et al. | 74/711 |

FOREIGN PATENT DOCUMENTS 60-252026 12/1985 Japan.
2189861 11/1987 United Kingdom.

*Primary Examiner*—Rodney H. Bonck
*Attorney, Agent, or Firm*—Stevens, Davis, Miller & Mosher

[57] ABSTRACT

A four wheel driving power transmission is provided which is interposed between an input shaft and an output shaft in a driving power transmitting system for the wheels of a four wheel drive car. The transmission is provided with a member in association with one of the input shaft and the output shaft and a cylindrical casing in association with the other. The casing seals therein a working fluid in a fluid-tight manner and houses a fluid pressure pump operating by relative rotation of the casing with respect to the shaft, a piston actuated by discharge pressure of the pump, and a sliding clutch for engaging the shaft with the cylindrical casing through operation of the piston.

16 Claims, 5 Drawing Sheets

FOUR WHEEL DRIVING POWER

FIELD OF THE INVENTION

The present invention relates to a four wheel driving power transmission, and more particularly to a four wheel driving power transmission, in a driving power transmitting system for driving front wheels or rear wheels of a four wheel driving car, which is adapted to transmit the driving power to the wheels at a rotational speed difference between the front wheels and the rear wheels.

BACKGROUND OF THE INVENTION

The conventional power transmission which transmits power of an engine for driving one of the front wheel and rear wheel to the other by operating a hydraulic clutch, has been well-known as disclosed in the Japanese Patent Laid-Open Gazette No. Sho 60-252,026.

The above power transmission interposes between a first rotary shaft for transmitting the driving power to the front wheels and a second one for transmitting the same to the rear wheels an oil pump driven by a rotational speed difference between both the rotary shafts and clutch means operated by oil pressure of the oil pump, so that, when a rotational speed difference is created between the first rotary shaft and the second one, the oil pump issues discharge pressure corresponding to the rotational speed difference, thereby connecting the clutch means through the discharge pressure to automatically transmit a torque to the second rotary shaft.

Such conventional power transmission, which is interposed between the first and second rotary shafts, is complicated in construction and its mounting position is restricted, thereby creating the problem in that there is no degree of freedom as to the mounting position. Also, a pressurized chamber or room for a piston which actuates the clutch means communicates with the suction side of the oil pump through orifices through which internal pressure at the pressurized room is controlled, but communicates through an open circuit open to the atmosphere, so that a separate oil tank is needed and the power transmission is large-sized as a whole and also a particular oil passage is required between the oil pump and the oil tank, thereby creating the problem in that the power transmission is complicated in construction and expensive to produce.

SUMMARY OF THE INVENTION

An object of the invention is to provide a four wheel driving power transmission which can, without complicating its shaft construction, be built in a desired position in a power transmitting system for transmitting the driving power to the front wheels or the rear wheels to thereby enable the degree of freedom of the mounting position to increase and which uses as a closed circuit circulation system closed circuit a working fluid from a fluid pressure pump for operating the clutch means, needs no particular oil tank, and has a simple passage construction and is small-sized.

In order to solve the aforesaid problems, the present invention has been designed as follows: In a driving power transmitting system for driving front wheels or rear wheels of a four wheel drive car, a four wheel driving power transmission adapted to transmit the driving power to the wheels at a rotational speed difference between the front wheels and the rear wheels, is provided with a shaft, a cylindrical casing rotatable relative thereto, a fluid pressure pump operable by relative rotation of the shaft to the cylindrical casing, a piston actuated by discharge pressure of the pump, and a sliding clutch, the fluid pressure pump, piston and sliding clutch being housed in the casing, the casing being provided therein with sealing means to seal the working fluid in a fluid-tight manner, the shaft and cylindrical casing being interposed between an input shaft and an output shaft at the wheel side in the power transmitting system, and the shaft being adapted to operate in association with one of the input shaft and output shaft and the cylindrical casing with the other.

Thus, the power transmission of the invention, which houses in the casing the fluid pressure pump, piston and sliding clutch and seals the working fluid in the same, can be built in a desired position between the input shaft and the output shaft in the power transmitting system for driving the front wheels or the rear wheels at a four wheel drive car. The shaft and cylindrical casing are interposed between the input shaft and the wheel side output shaft, so that when a rotational speed difference is created therebetween, the fluid pressure pump operates to transmit to the wheel side output shaft a torque corresponding to the rotational speed difference.

The present invention is characterized in that (1) the cylindrical casing is provided with a partition interposed between the fluid pressure pump and the sliding clutch, so that the piston is interposed between the clutch and the partition to thereby partition a pressurized chamber or room for the piston, which communicates with the discharge side of the fluid pressure pump through the partition, and a clutch operating chamber or room; (2) an orifice for controlling pressure in the pressurerized room is provided between the pressurized room and the clutch operating room, a return passage for the working fluid being provided between the clutch operating room and the fluid pressure pump; (3) the orifice is provided with a valve body for controlling an open area of the orifice, the valve body providing control means therefor controllable from the exterior; (4) the partition is provided with a cylindrical member having an inner cylinder and an outer cylinder, the piston is housed axially movably in the cylindrical member to form the pressurized room for the piston, the orifice for controlling pressure in the pressurized room is provided between the pressurized room and the clutch operating room, and an outside return passage communicating with the suction side of the fluid pressure pump is provided between the outer cylinder and the cylindrical casing; (5) at the partition is provided an orifice through which the pressurized room for the piston communicates with the suction side of the fluid pressure pump, and between the inner cylinder and the shaft is provided an inner return passage through which the orifice communicates with the clutch operation room; (6) a valve body having a control portion and facing the orifice is supported to the partition such that it is adjustable to move towards or away from the orifice, and at the cylindrical casing is provided an operating bore through which the control portion at the valve body is open outwardly from the cylindrical casing; (7) an oil strainer is provided at the exit sides of discharge conduits provided at the partition; (8) the sliding clutch is provided with a plurality of clutch plates at the shaft side and engageable with the shaft, and with a plurality of clutch plates at the casing side and engageable with the casing, and the shaft side clutch plates providing communication bores for the working fluid; (9) the cylindrical casing is provided therein with relief valves for setting the maximum fluid pressure of the pressurized room for the piston; (10) the cylindrical casing is provided therein with a member rotatable integrally with the cylindrical casing, the member being provided with relief valves which set the maximum fluid pressure in the pressurized room for the piston and automatically adjust the maximum fluid pressure to lower as the number of rotations of the input shaft increases; (11) the cylindrical casing is provided therein with a member for sealing the working fluid in a fluid-tight manner and an oil seal is provided between the sealing member and the shaft side member including the shaft; (12) the shaft member is provided with injection means for injecting the working fluid into the cylindrical casing, and closing means for closing a fluid injection conduit at this means; (13) the shaft is provided with a sump for the working fluid, communicating with the suction side of the fluid pressure pump; (14) the shaft is provided with a mounting flange connecting with one of the input shaft and output shaft for the wheels in the power transmitting system, the cylindrical casing is provided with a mounting flange connecting with the other, also the shaft comprises a separate member with respect to the input and output shafts, the shaft and cylindrical casing are connected relative-rotatably to each other by bearings, and the cylindrical casing houses therein the fluid pressure pump, piston and sliding clutch, thereby constituting a power transmission unit; and (15) the cylindrical casing is provided with a pump body including the partition, the pump body is provided with a pair of suction passages and a pair of discharge passages communicating with the suction side and the discharge side of the fluid pressure pump, and one-way valves different from each other in the closing direction are provided at the suction passage and discharge passage at the pump body.

These and other objects of the invention will become more apparent in the detailed description and examples which follow.

DETAILED DESCRIPTION OF THE INVENTION

Figure 1:
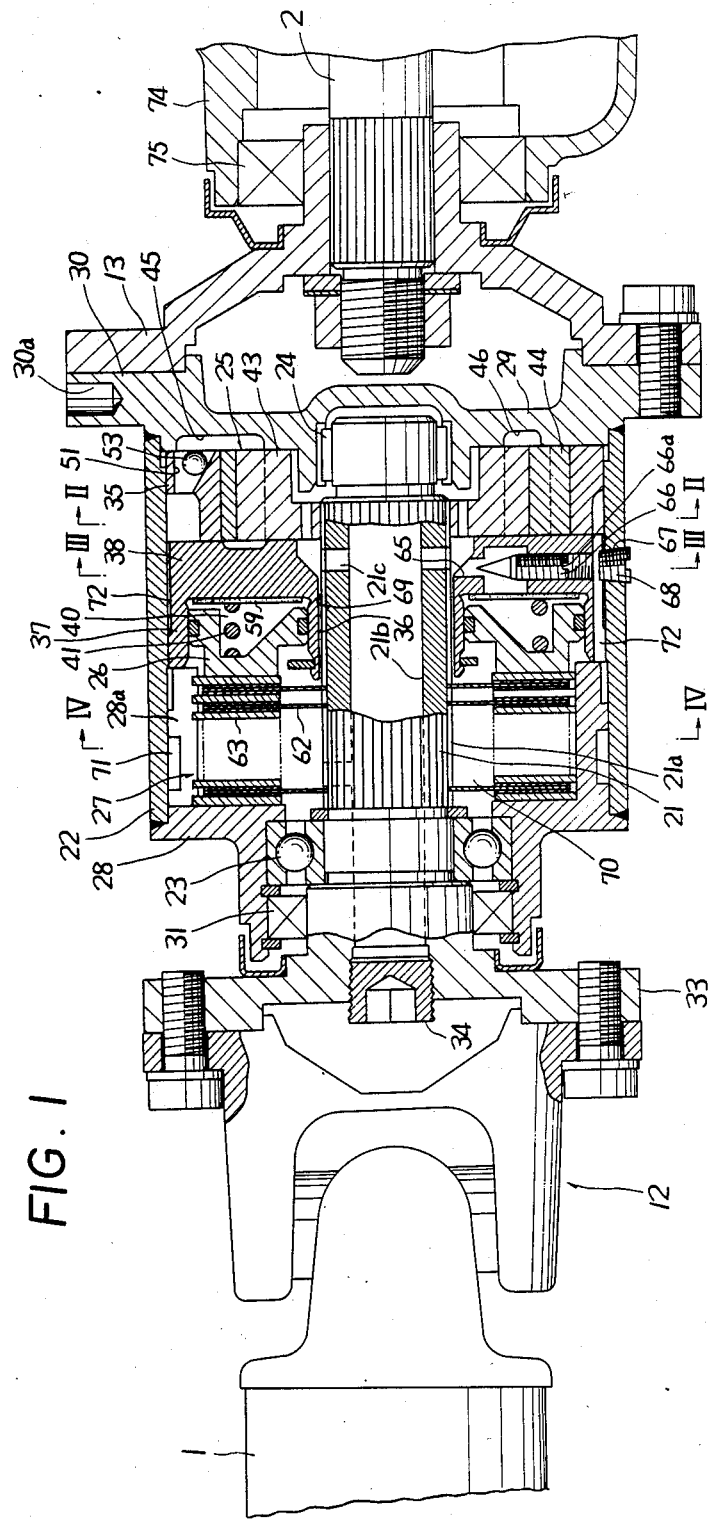
FIG. 1 is a longitudinal sectional view of a first embodiment of a four wheel driving power transmission of the invention.
Figure 6:
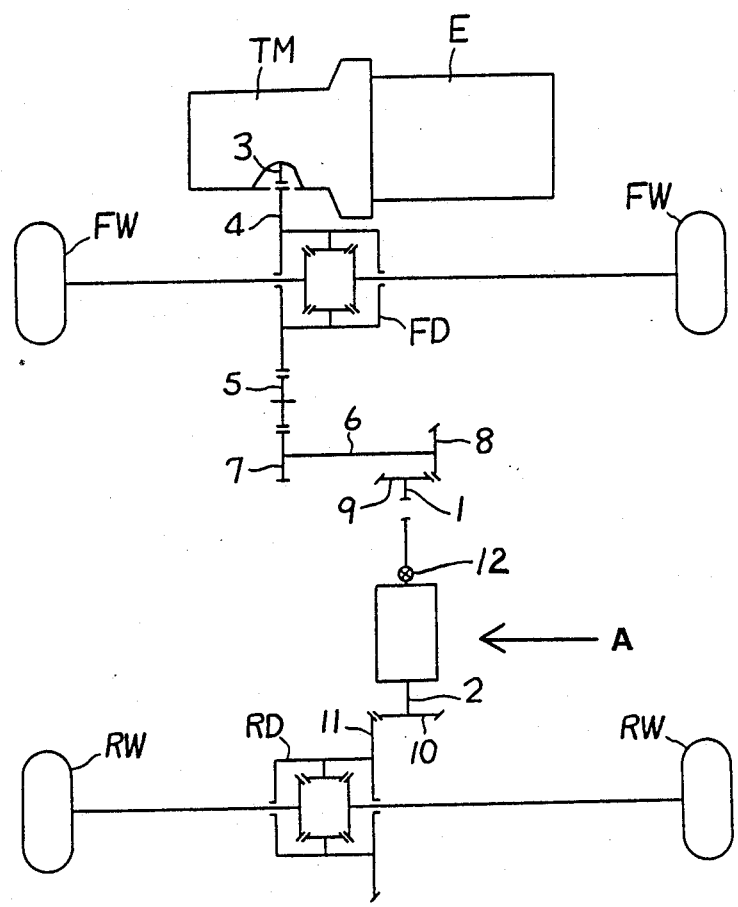
FIG. 6 is a schematic view exemplary of the power transmission of the invention applied to a four wheel drive system.
Figure 7:
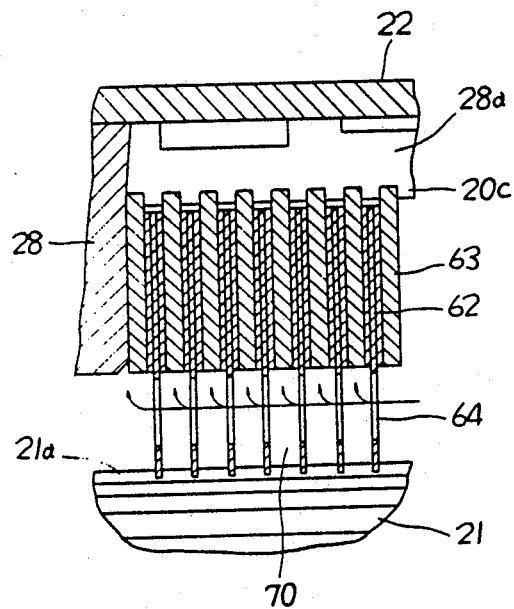
FIG. 7 is a partially enlarged sectional view of clutch means.

Referring to FIG. 1, a first embodiment of the invention is shown which is applied to a four wheel drive car having an engine E disposed as shown in FIG. 6 in the front of the car to drive front wheels FW and transmitting driving power of the engine E to rear wheels RW through an input shaft 1 and an output shaft 2 at the wheel side.

At first, explanation will be given on FIG. 6, in which a transmission gear TM is connected to the lateral side of the engine E and an output gear 3 of the transmission gear TM engages with a ring gear 4 at a front wheel differential gear FD so as to drive the front wheels FW.

The ring gear 4 engages through an intermediate gear 5 with a gear 7 provided at one end of an intermediate shaft 6 and a bevel gear 8 provided at the other end thereof engages with a bevel gear 9 provided at one end of the input shaft 1.

The wheel side output shaft 2 in FIG. 6 is provided at the utmost end thereof with a bevel gear 10 in engagement with a ring gear 11 at a rear wheel differential gear RD for driving the rear wheels RW.

In FIG. 6, the embodiment of the power transmission A of the invention is interposed between the input shaft 1 and the wheel side output shaft 2 and at the coupling portion of input shaft with a rear wheel differential gear RD.

In addition, in the present invention the input shaft 1 and wheel side output shaft 2 are decided to be of optional length and the mounting position of power transmission A can be freely selected its mounting position. Alternatively, the input shaft 1 may be made short and the power transmission A may be disposed in the vicinity of the front wheel differential gear FD.

Next, explanation will be given on a power transmission A shown in FIG. 1.

The power transmission A comprises a shaft 21, a cylindrical casing 22 which covers the shaft 21 and is supported relative-rotatably with respect thereto through bearings 23 and 24, a fluid pressure pump 25 operable by relative rotation of the shaft 21 to the cylindrical casing 22, a piston 26 actuated by discharge pressure of the pump 25, and sliding clutch means 27 for engaging the shaft 21 with the cylindrical casing 22 through operation of the piston 26. In FIG. 1, the shaft 21 connects with the input shaft 1 through a universal joint 12, the cylindrical casing 22 connecting with the output shaft 2 through a connecting member 13 to be discussed below.

The cylindrical casing 22 is provided at the front with a front member 28 to support the front of the shaft 21 through the bearing 23 and at the rear with a rear member 29 to support the rear of the shaft 21 through the bearing 24, the rear member 29 being provided with a mounting flange 30 which has a rotation balance adjusting bore 30a, and connecting with the output shaft 2 through the connecting member 13 which is spline-connected therewith.

An oil seal 31 is interposed between the front member 28 and the shaft 21 so that the cylindrical casing 22, front member 28 and rear member 29, are tightly together, thereby enabling the working fluid to be sealed in the casing 22 in a fluid-tight manner.

The shaft 21 is provided at the front thereof with a mounting flange 33 connecting with the universal joint 12, at the outer periphery of an intermediate portion with splines 21a, and at the axial center with a vacant chamber or room 21b serving as a sump for the working fluid. The vacant room 21b expands its charging volume for the working fluid in the cylindrical casing 22, is formed throughout an entire axial length of shaft 21, and is provided at the axial front and rear portions with openings 21c open at the outer periphery of the shaft 21. The vacant room 21b is open at the rear end thereof behind the bearing 24 and detachably carries at the front end a plug 34 so that the plug 34 is removed to inject the working fluid into the casing 22.

At a side of the rear member 29 in the cylindrical casing 22 are disposed a pump body 35 and a partition 38 having a projecting inner cylinder 36 and an outer cylinder 37 to form a cylindrical member, the piston 26 is disposed between the inner cylinder 36 and the outer cylinder 37, the sliding clutch means 27 is disposed in front of the piston 26, between the piston 26 and the partition 38 is formed a pressurized chamber or room 40 for the piston 26, communicating with the discharge side of the pump 25 through discharge passages 55 and 56 provided at the partition 38, and a spring 41 for biasing the partition 38 to the pump body 35 is housed in the pressurized room 40. In addition, the pump body 35 and partition 38 are coupled with the rear member 29 through a pin 42 shown in FIGS. 2, 3 and 5, thereby being restrained from relative rotation to the cylindrical casing 22. Thus, the pump body 35 and partition 38 including the cylindrical member are adapted to rotate integrally with the casing 22.

Figure 2:
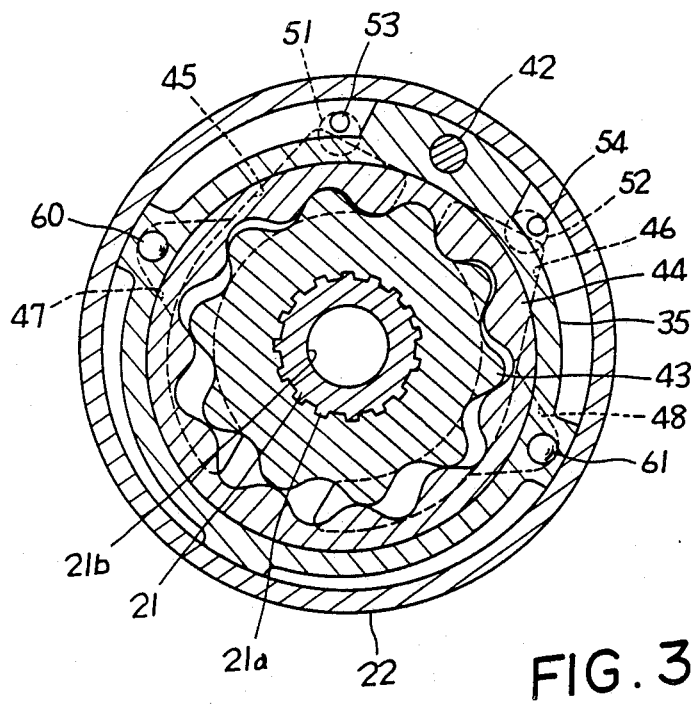
FIG. 2 is a sectional view taken on the line II—II in FIG. 1.

The fluid pressure pump 25 is of trochoid type and, as shown in FIG. 2, an external gear thereof 43 is spline-coupled with splines 21a at the shaft 21, an internal gear 44 being rotatably fitted into the pump body 35 to be eccentric with respect to the axis of the shaft 21.

Figure 3:
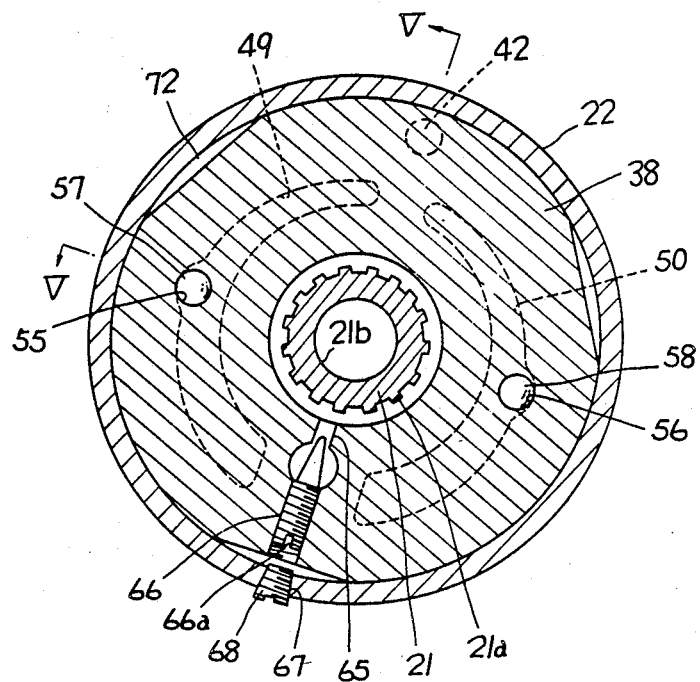
FIG. 3 is a sectional view taken on the line III—III in FIG. 1.

At the left side of the rear member 29, as shown by the dotted line in FIG. 2, are provided connecting ports 47 and 48 communicating with suction ports 45 and 46 for the pump 25 at the discharge side thereof and connecting with relief bores to be discussed below, and at the right side of the partition 38, as shown by the dotted line in FIG. 3, are provided discharge ports 49 and 50. The pump body 35 is provided with suction passages 51 and 52 through which outside return passages for the working fluid to be discussed below communicate with the suction ports 45 and 46 respectively. Check valves 53 and 54 different in direction from each other are provided in the suction passages 51 and 52 respectively. The partition 38 is provided with discharge passages 55 and 56 through which the pressurized room 40 communicates with the discharge port 49 and 50, the discharge passages 55 and 56 being provided therein with check valves 57 and 58 different in direction from each other so that, even when the pump 25 is driven normally or reversely, the working fluid can be discharged into the pressurized room 40. Also, a flat oil strainer 59 is disposed at the pressurized room side of the partition 38 and held by the spring 41 and the one-way valve 57 is prevented by the oil strainer 59 from escaping toward the pressurized room 40.

Figure 5:
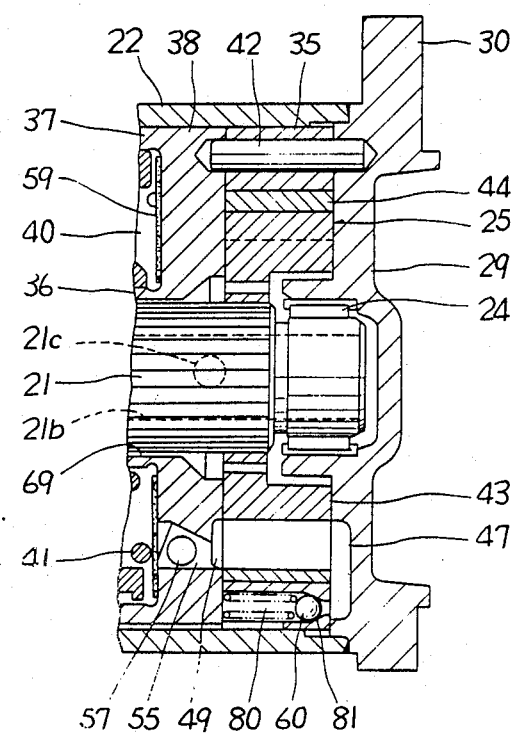
FIG. 5 is a sectional view taken on the line V—V in FIG. 3.

The pump body 35, as shown in FIG. 5, is provided with relief bores open at one end to the connecting ports 47 and 48 and at their other ends to the outside return passages respectively, the relief bores providing therein relief valves 60 and 61 for setting the maximum fluid pressure of the pressurized room 40 respectively.

Figure 4:
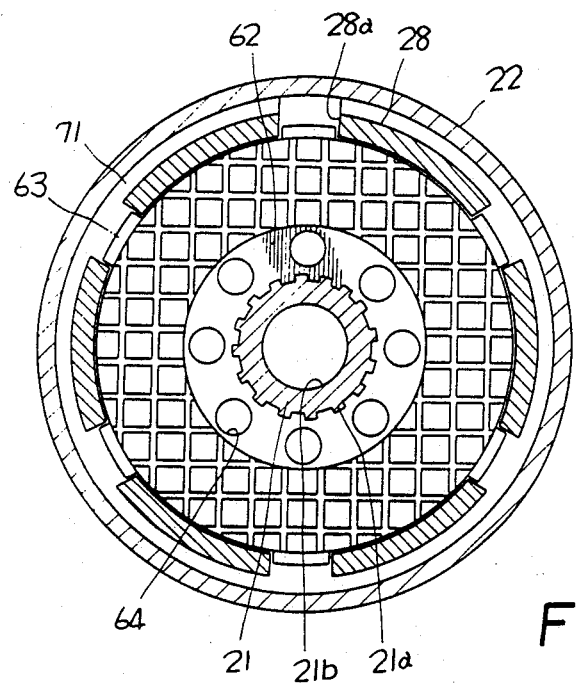
FIG. 4 is a sectional view taken on the line IV—IV in FIG. 1.

Sliding clutch means 27 comprises a plurality of clutch plates 62 at the shaft side which are spline-coupled with the splines 21a at the shaft 21 and a plurality of clutch plates 63 at the casing side to be coupled with cutouts 28a provided at the inner periphery of the front member 28, both the clutch plates 62 and 63 being disposed alternately. Also, the clutch plates 62 at the shaft side are provided at their radially inner portions with a plurality of fluid communication bores 64 as shown in FIGS. 4 and 6.

Also, the partition 38, as shown in FIG. 3, is provided with an orifice 65 communicating at one end thereof with the pressurized room 40 and at the other end with an inner return passage 69 to be discussed below so as to control the pressure in the pressurized room 40. A threaded bore is provided radially outwardly of and in alighment with the orifice 65 and a needle valve body 66 having a control portion 66a screws with the threaded bore to be movable toward or away from the orifice 65 and so as to control an opening area thereof. At the cylindrical casing 22 is provided an operation bore 67 for opening the control portion 66a to the exterior of the casing 22.

A plug 68 screws with the operation bore 67 and always prevents leakage of the working fluid charged into the casing 22 through the bore 67. Also, the plug 68 is removed from the bore 67 and a jig, such as a screw driver, is inserted thereinto, thereby enabling the valve body 66 to be controllable from the exterior.

Between the inner cylinder 36 at the partition 38 and the shaft 21 is formed a gap including the spline recesses 21a so that the gap forms the inner return passage 69. Accordingly, the working fluid having passed the orifice 65 is discharged into an operating room 70 for the clutch means 27 through the inner return passages 69 and vacant room 21b and then flows through the communication bores 64 at the shaft side clutch plates 62 radially outwardly of all the clutch plates 62 and 63 by centrifugal force, thereby lubricating and cooling them.

Between the outer periphery of the front member 28 and the inner periphery of the cylindrical casing 22 is provided a gap 71 communicating with the cutouts 28a as shown in FIG. 4, and between the outer peripheries of the partition 38 and outer cylinder 37 and the inner periphery of cylindrical casing 22 are provided outside return passages 72 through which the gap 71 communicates with the suction passages 51 and 52 provided at the pump body 35.

Accordingly, the working fluid, which has lubricated and cooled the clutch plates 62 and 63 and flowed radially outwardly, passes the gap 71, outside return passage 72 and the suction passage 51 or 52, and is returned from the one way valve 53 or 54 to the suction port 45 or 46. Hence, part of the working fluid discharged from the pump 25 circulates in the casing 22 via the orifice 65, inside return passage 69, clutch operating room 70, gap 71 and outside return passages 72.

In this case, since the suction passages 51 and 52 communicate with the outside return passages 72 and suck the working fluid from the radial outside, even when air is mixed with the fluid, there is less risk of sucking the air, thereby improving pump efficiency. Also, the vacant room 21b formed at the shaft 21 ensures a sufficient amount of the working fluid.

In FIG. 1, a reference numeral 74 designates a housing for a rear wheel differential gear RD supporting the output shaft, and 75 designates a bearing therefor.

Next, explanation will be given on the power transmission A as to its operation.

At first, when the input shaft 1 and wheel side output shaft 2 rotate at equal speed, the shaft 21 and cylindrical casing 22 do not rotate relative to each other. Accordingly, the fluid pressure pump 25 is not driven and the clutch means 27 is disconnected, thereby transmitting no torque from the input shaft 1 to the wheel side output shaft 2.

Now, when a rotation difference is created between the input shaft 1 and the output shaft 2 because the front wheels FW slip, the pump 25 is driven corresponding to the rotation difference.

The discharge pressure of the pump 25 increases corresponding to the rotation difference so that, when the discharge pressure rises to raise the internal pressure of the pressurized room 40, the piston 26 operates to urge the clutch plates 62 and 63 and increases an engaging force while sliding, thereby transmitting a torque of the input shaft 1 from the shaft 21 to the casing 22 and output shaft 2, through the clutch plates 62 and 63.

As a result, the number of rotations of the output shaft 2 increases up to that of the input shaft 1, thereby reducing or eliminating a slip of the front wheel FW.

When the slip of the front wheel FW decreases, the number of relative rotations of the shaft 21 to the cylindrical casing 22 is reduced, whereby the discharge pressure of the pump 25 lowers and the transmitted torque also decreases.

In the above construction, since the cylindrical casing 22 is filled almost entirely with the working fluid, even when centrifugal fluid pressure is generated in the pressurized room 40, the clutch operation room 70 adjacent thereto through the piston 26 also is filled with the working fluid and the centrifugal fluid pressure also is generated therein, whereby the centrifugal pressure generated in the pressurized room 40 is offset by that in the clutch operation room 70. Hence, even when the number of input rotations increases, there is no risk that the piston 26 will malfunction to engage the clutch means 27 by mistake.

Also, the clutch plates 62 and 63, which are cooled by te circulating working fluid always in contact therewith, are restricted from heating and undergo decreased deterioration or wearing.

In particular, the working fluid flows nearly uniformly in the clutch operation room 70 through the communication bores 64 and the shaft side clutch plates 62, thereby ensuring the lubrication and cooling of the clutch means 27. Also, since wide passages for the circulating working fluid at the clutch means 27 can be ensured, cavitation is not produced.

The cylindrical casing 22 is kept therein fluid-tight by the front and rear members 28 and 29 and oil seal 31 so as to be free from outward leakage of the working fluid. Hence, the power transmission of the invention is applicable as it is, in other words, without being provided in a housing or using a separate cover, to any part of the input shaft 1 used under severe condition or to the coupling with the rear wheel differential gear RD, thereby being mountable at a desired position in the power transmitting system.

In the first embodiment shown in FIG. 1, the shaft 21 and cylindrical casing 22 are provided with mounting flanges 33 and 30 to be connected with the input shaft 1 and wheel side output shaft 2 respectively and the shaft 21 and casing 22 are coupled such that they are abled to rotate relative to each other through bearings 23 and 24 so as to be formed as a unit, whereby the power transmission of the invention is applicable to the input shaft 1 and output shaft 2 with ease.

Since an open area of the orifice 65 is adjustable by the valve body 66, variation in the transmitting torque with respect to the rotation speed difference is adjustable to a desired characteristic. Hence, even when there is variation in the side clearance between the pump body 35 and the rear member 29 or the partition 38, the power transmission A can have its characteristic adjusted desirably and its performance can be stabilized.

Furthermore, the valve seat surface 81 at the relief bore 80 containing therein the relief valve 60 or 61 is tapered as shown in FIG. 5 to allow each relief valve 60 or 61 to move by a centrifugal force acting thereon in the opening direction, whereby it is possible to automatically adjust the maximum fluid pressure to be reduced as the rotational speed of casing 22 increases.

Thus, even when a rotation difference is created between the input shaft 1 and the output shaft 2 during the high speed running of the car, the torque is not transmitted to the output shaft 2, thereby enabling improvement in fuel expense and extension of the life span of the respective clutch plates 62 and 63.

Next, explanation will be given on a second embodiment of the power transmission of the invention in accordance with FIG. 8.

Figure 8:
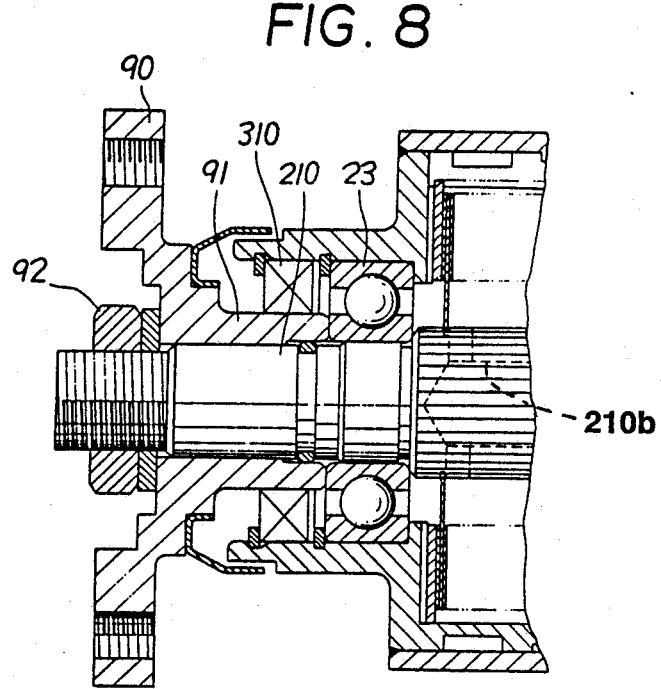
FIG. 8 is a partial sectional view of a second embodiment of the invention, corresponding to FIG. 1.

In FIG. 8, an end member 91 having a mounting flange 90 is spline-coupled with the front portion of a shaft 210 and fixed thereto by a nut 92 screwable with a threaded screw formed at the outer periphery of the front portion of the same, a vacant chamber or room 210b formed at the central portion of the shaft 210 is made blind, the end member 91 is removed from the shaft 210 to enable the working fluid to be charged into the casing 22, and an oil seal 310 is provided between the end member 91 and the front member 28 to seal the working fluid into the casing 22 in a fluid-tight manner. In addition, other components in FIG. 8 are the same as those in the first embodiment.

Alternatively, in the various embodiments, the shaft 21 may operate in association with the output shaft 2 and the cylindrical casing 22 with the input shaft 1. Also, the input shaft 1 and output shaft 2 may transmit power to the front wheels.

Alternatively, the clutch means 27 may be disposed between the fluid pressure pump 25 and the piston 26, and the piston 26 and clutch 27 may be disposed radially of the shaft 21.

Also, the fluid pressure pump 25 may alternatively use a vane pump or a piston pump other than the gear pump, and the clutch means 27 may be a cone type clutch means other than a multiplate clutch means.

Furthermore, the piston 26 may alternatively use an elastic film type piston other than a hard member.

As seen from the above, the power transmission of the invention employs the shaft and the cylindrical casing housing therein the fluid pressure pump, piston and sliding clutch means, seals the working fluid in the casing, and has the shaft and casing disposed in association with the input shaft and wheel side output shaft at the power transmitting system for transmitting the power to the front wheels or the rear wheels at the four wheel drive car, whereby the power transmission is not defined or limited in its mounting position, but can be disposed at a desired position on the input shaft and output shaft, thereby increasing the degree of freedom for the mounting position. Also, the centrifugal pressure of the working fluid in the pressurized room for the piston, even when raised by an increase in the number of rotations, can be offset by that of the fluid in the clutch operation room, whereby there is no risk that the clutch means 27 will engage by mistake. Moreover, since the working fluid is sealed in the cylindrical casing to constitute a closed circuit circulation system, a particular oil tank is not required and the passages for the working fluid can have a simple construction, resulting in that the power transmission of the invention can be small-sized and simple in construction as a whole.

Although several embodiments have been described, they are merely exemplary of the invention and not to be construed as limiting, the invention being defined solely by the appended claims.

What is claimed is:

1. A four wheel driving power transmission in a power transmitting system for driving front wheels or rear wheels of a four wheel drive car, said power transmitting system comprising an input shaft and a wheel side output shaft adapted to transmit power to said wheels at a rotational speed difference between said front wheels and said rear wheels, said power transmission being provided with a shaft member provided with a connecting means for connecting with one of said input shaft and said wheel side output shaft, a cylindrical casing covering said shaft member and provided at one lengthwise side with a front member having a bearing for supporting a front portion of said shaft member and provided at its other lengthwise side with a rear member having a bearing for supporting a rear portion of said shaft member and a connecting means for connecting with the other of said input shaft and said wheel side output shaft, said cylindrical casing and said shaft member forming a closed space, a seal means interposed between said shaft member and said front member supporting said front portion of said shaft member to cause said closed space to be in a liquid-sealed condition, a sealing means for sealing a working fluid in a closed space of said cylindrical casing, means comprising a fluid pressure pump operating by relative rotation of said shaft to said cylindrical casing, a piston actuated by discharge pressure of said pump, and a sliding clutch which engages said shaft member with said cylindrical casing by operation of said piston, and for transmitting power from one of said shaft member and said cylindrical casing to the other upon engagement of said clutch by operation of said piston, said means being housed within said closed space of said cylindrical casing and said working fluid being adapted to circulate in said closed space of said cylindrical casing.

2. A four wheel driving power transmission according to claim 1, wherein said cylindrical casing is provided with a partition interposed between said fluid pressure pump and said sliding clutch means so that a piston is interposed between said clutch means and said partition to thereby provide a partition for a pressurized chamber for said piston, communicating with the discharge side of said fluid pressure pump through said partition and a clutch operation chamber of said sliding clutch.

3. A four wheel driving power transmission according to claim 2, wherein an orifice for controlling pressure in said pressurized chamber for said piston is provided between said pressurized chamber for said piston and said clutch operation chamber and a return passage for said working fluid is provided between said clutch operation chamber and said fluid pressure pump.

4. A four wheel driving power transmission according to claim 3, wherein said orifice is provided with a valve body for controlling an open area of said orifice, said valve body being provided with control means controllable from the exterior.

5. A four wheel driving power transmission according to claim 3, wherein said partition is provided with a cylindrical member having an inner cylinder and an outer cylinder, said cylindrical member housing therein said piston in relation of being axially movably so as to form said pressurized chamber for said piston, said orifice for controlling pressure in said pressurized chamber being provided between said pressurized chamber and said clutch operation chamber, and outside return passages communicating with the suction side of said fluid pressure pump are provided between said outer cylinder and said cylindrical casing.

6. A four wheel driving power transmission according to claim 5, wherein said partition is provided with an orifice through which said pressurized chambers for said piston communicates with the suction side of said fluid pressure pump, and between said inner cylinder and said shaft is provided an inside return passage through which said orifice communicates with said clutch operation chamber.

7. A four wheel driving power transmission according to claim 6, wherein said partition supports a valve body having a control portion and facing said orifice, such that it is adjustable to move toward or away from said orifice, and said cylindrical casing is provided with an operating bore to open said control portion at said valve body outwardly from said cylindrical casing.

8. A four wheel driving power transmission according to claim 6, wherein an oil strainer is provided at the exit sides of discharge passages provided at said partition.

9. A four wheel driving power transmission according to claim 3, wherein said sliding clutch is provided with a plurality of clutch plates at said shaft side engageable with said shaft and a plurality of clutch plates at said casing side engageable with said cylindrical casing, said shaft side clutch plates being provided with communication bores for said working fluid.

10. A four wheel driving power transmission according to claim 2, wherein said cylindrical casing is provided therein with relief valves for setting the maximum pressure in said pressurized chamber for said piston.

11. A four wheel driving power transmission according to claim 2, wherein said cylindrical casing is provided therein with a member rotating integrally therewith, said member being provided with relief valves which set the maximum fluid pressure in said pressurized chamber for said piston and automatically adjust said maximum pressure to lower as the rotational speed of the cylindrical casing increases.

12. A four wheel driving power transmission according to claim 1, wherein said cylindrical casing is provided with a member for sealing said working fluid in said casing in a fluid-tight manner, and an oil seal is provided between said member and a shaft side member including said shaft.

13. A four wheel driving power transmission according to claim 1, wherein said shaft is provided with injection means for injecting said working fluid into said cylindrical casing and closing means for closing a fluid injection conduit at said injection means.

14. A four wheel driving power transmission according to claim 1, wherein said shaft is provided with a sump for said working fluid, which communicates with the suction side of said fluid pressure pump.

15. A four wheel driving power transmission according to claim 1, wherein said shaft is provided with a mounting flange connecting with one of said input shaft and wheel side output shaft at said power transmitting system, said cylindrical casing is provided with a mounting flange connecting with the other of said input shaft and output shaft, said shaft comprises a separate member with respect to said input shaft and wheel side output shaft, said shaft and cylindrical casing are coupled relative-rotatably to each other by bearings, and said cylindrical casing houses therein said fluid pressure pump, piston, and sliding clutch means, thereby constituting a power transmission unit.

16. A four wheel driving power transmission according to claim 1, wherein said cylindrical casing is provided with a pump body including said partition, said pump body is provided with a pair of suction passages and a pair of discharge passages communicating with the suction side and the discharge side of said fluid pressure pump, and at said suction passages and discharge passages are provided one-way valves different from each other in the closing direction.

* * * * *